United States Patent [19]

Shew et al.

[11] Patent Number: 5,277,339
[45] Date of Patent: Jan. 11, 1994

[54] DUAL MODE PISTOL-GRIP GREASE GUN

[75] Inventors: Jerry D. Shew, Charlotte; Jack H. Ritterskamp, Jr., Indian Trail, both of N.C.

[73] Assignee: Alemite Corporation, Charlotte, N.C.

[21] Appl. No.: 62,734

[22] Filed: May 11, 1993

Related U.S. Application Data

[63] Continuation of Ser. No. 857,756, Mar. 26, 1992, abandoned.

[51] Int. Cl.⁵ ............................................. G01F 11/00
[52] U.S. Cl. .................................. 222/256; 222/287; 222/309; 222/383; 184/105.2
[58] Field of Search .............. 222/256, 309, 380, 340, 222/383, 287; 184/105.1, 105.2

[56] References Cited

U.S. PATENT DOCUMENTS

| D. 295,599 | 5/1989 | Shew | D8/14.1 |
| 705,645 | 7/1902 | Caswell | 222/309 |
| 1,377,023 | 5/1992 | Nelson | 222/256 |
| 1,619,126 | 3/1927 | Hundemer | 222/256 |
| 1,905,878 | 4/1933 | Albertine | 222/256 |
| 2,497,762 | 2/1950 | Davis | 222/256 X |
| 4,168,787 | 9/1979 | Stamper | 222/256 |
| 4,664,298 | 5/1987 | Skew | 222/309 X |

Primary Examiner—Gregory L. Huson
Attorney, Agent, or Firm—Lorusso & Loud

[57] ABSTRACT

A dual mode pistol grip grease gun that operates in either the volume mode or the pressure mode. The grease gun comprises a cylinder head, which has a handle fixed to it. Attached to the handle via a shiftable link is a lever, which has a U-shaped slot disposed at one end. The shiftable link is disposed in the U-shaped slot of the lever, and its position therein defines whether the grease gun is in the volume or the pressure mode. Rotatably attached to the lever is a piston, which enters the cylinder head when the lever is depressed. A stop disposed in the lever that rests against the piston keeps the span between the lever and the handle the same for both the volume and pressure modes.

2 Claims, 4 Drawing Sheets

DUAL MODE PISTOL-GRIP GREASE GUN

This is a continuation of copending application Ser. No. 07/857,756 filed on Mar. 26, 1992, and now abandoned.

BACKGROUND OF THE INVENTION

The present invention relates generally to fluid lubricant dispensing equipment, and more particularly to a novel pistol-grip grease gun that can be operated in either pressure mode or volume mode.

A major advantage of pistol-grip grease guns is that they can be operated with only one hand. Heretofore, available pistol-grip grease guns only operated in one mode, usually the volume mode, but occasionally in the pressure mode. A grease gun user uses the volume mode when he/she wishes to get as much lubricant per stroke into a grease-fitting as possible. Often, a grease gun user will require the use of a pressure mode, such as when a grease-fitting is frozen, impeding the flow of lubricant, or when a bearing has such a high tolerance that getting lubricant into it requires more pressure Prior art pistol-grip grease guns provide satisfactory volume mode performance. However, because of their inherent stroke and leverage limitations, large lubricant volume is provided at low pressure. When a pistol-grip grease gun user needed extra pressure in the past, he/she has been required to switch guns, resulting in inconvenience and reductions in productivity.

Grease guns that can operate both in pressure mode and volume mode, otherwise known as dual mode grease guns, are advantageous to the user. However, they are currently available only in lever-type grease guns. A major disadvantage of lever-type grease guns is that they require the user to use two hands, which is often not feasible. The only type of grease gun that allows the user to use only one hand is the pistol-grip grease gun.

Hence, there is a need in the art for a pistol-grip grease gun that can operate in both the volume mode and the pressure mode. The present invention satisfies this need.

SUMMARY OF THE INVENTION

It is, therefore, an object of the invention to provide a dual mode pistol-grip grease gun.

A further object of the invention is to provide a dual mode pistol-grip grease gun that has a pressure mode and a volume mode, and the grease gun, while in the volume mode, provides as much grease per stroke as a volume mode pistol-grip grease gun that does not have a pressure mode.

A still further object of the invention is to provide a dual mode pistol-grip grease gun that provides the same span between the grease gun's handle and lever in both the volume mode and pressure mode.

An even still further object of the invention is to provide a dual mode pistol-grip grease gun that only has a small increase in manufacturing cost over that of a single mode pistol-grip grease gun.

With the above and other objects in view, as will hereinafter appear, a feature of the present invention is the provision of a dual mode pistol-grip grease gun, the gun comprising a cylinder head portion having a recess formed therein, the cylinder head portion further having a piston cavity therein extending through the cylinder head portion. The piston cavity is adapted to receive lubricant from a cylinder fixed in the recess. The grease gun also has a handle having a first end fixed to the cylinder head portion, and a free second end having a protrusion disposed thereon, the handle having a passage formed therein. The grease gun has a link having a first end connected to the handle at the handle first end by a first connection means.

The grease gun also has a lever having a first end having a U-shaped slot therein, the link first end being slidably mounted in the U-shaped slot by a second connection means. The U-shaped slot has a first end portion adapted to receive a link second end and a second end portion adapted to receive the link second end, wherein the link second end is movable between the slot first end portion and the slot second end portion of the U-shaped slot, wherein positioning the link second end in the slot first portion adapts the grease gun to operate in a volume mode and wherein positioning the link second end in the slot second portion adapts the grease gun to operate in a pressure mode.

The grease gun also has a piston rotatably fastened to a central portion of the lever, the piston passing through the passage formed in the handle and in alignment with the piston cavity. The grease gun also has a spring surrounding the piston, and a stop disposed in the lever central portion and in engagement with a side of the piston, the stop thereby preventing the lever from moving further toward the side of the piston.

The above and other features of the invention, including various novel details of construction and combination of parts, will now be more particularly described with reference to the accompanying drawings and pointed out in the claims. It will be understood that the particular device and methods embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
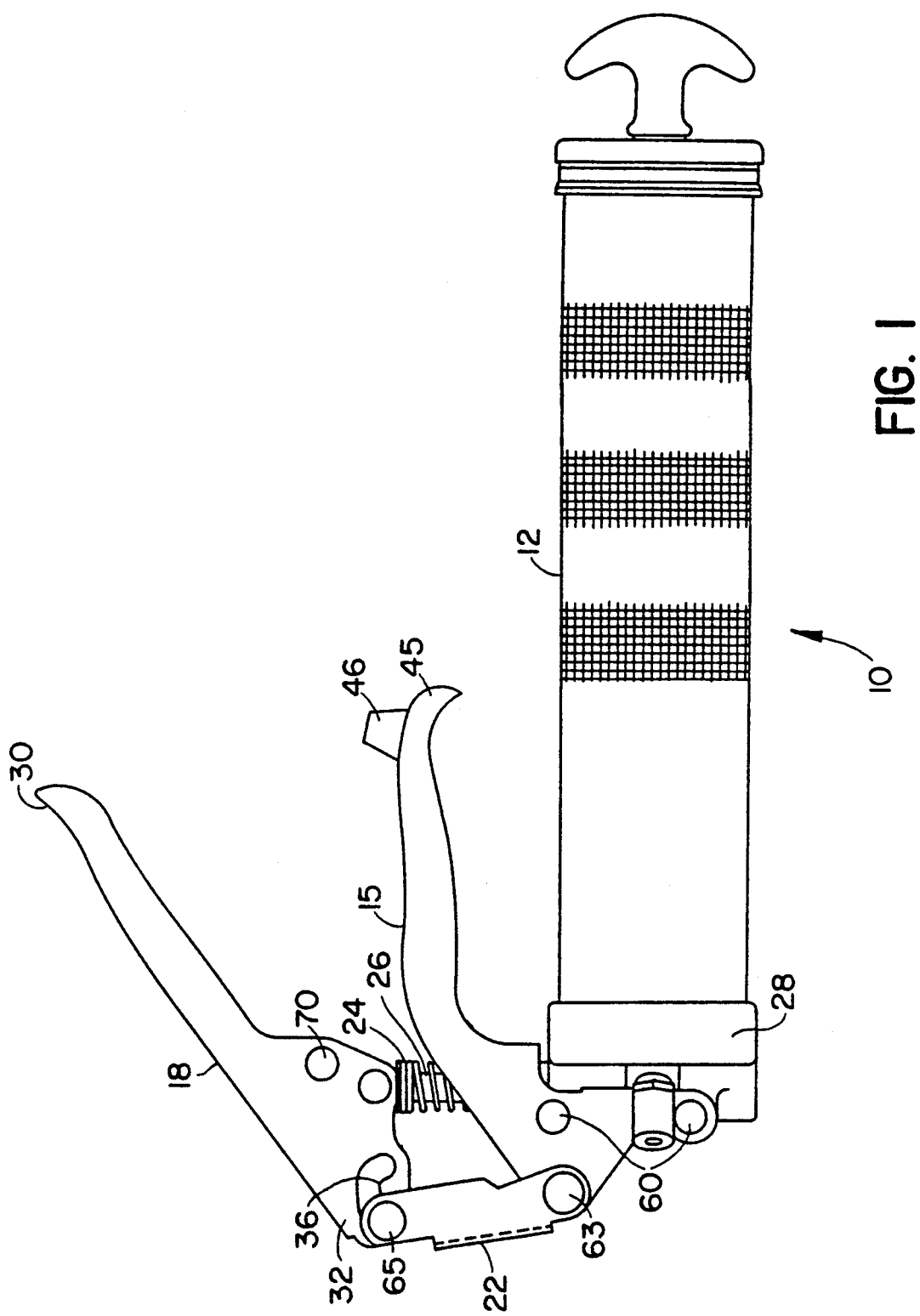
FIG. 1 is a side view of a dual mode pistol-grip grease gun which illustrative of the invention.

Referring to the drawings, and in particular, FIG. 1, a dual mode pistol-grip grease gun 10 is seen. The grease gun 10 comprises a cylinder 12 The cylinder 12 contains the lubricant when the grease gun 10 is charged and is attachable to a lubricant dispensing cylinder head 28. The cylinder head 28 can be any grease gun cylinder head of conventional design. Connected to the cylinder head 28 is a handle 15. The handle 15 is connected to a shiftable link 22. The shiftable link 22 is also connected to a lever 18 via a U-shaped slot 36 located on the lever 18. Also connected to the lever 18 is a piston 26. The piston 26 moves in and out of the cylinder head 28, in which it is disposed. Surrounding the piston 26 is a spring 24 which biases the lever 18, thereby forcing the piston away from the cylinder head 28.

Figure 2:
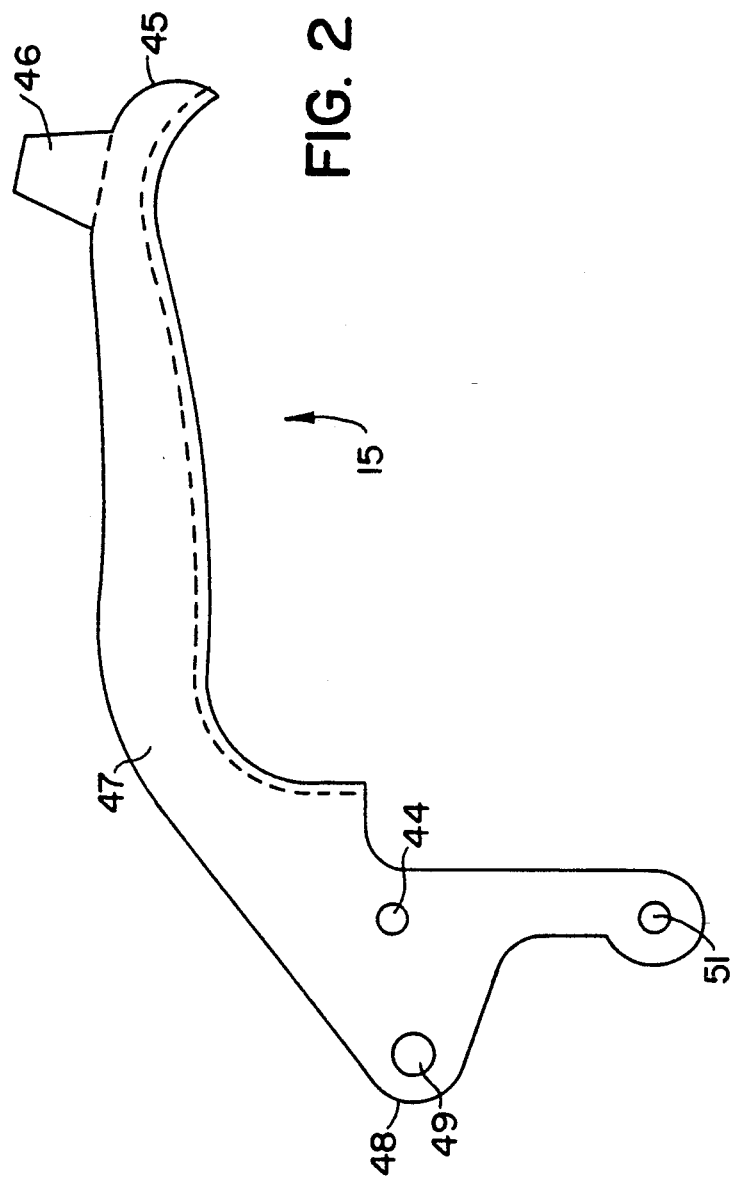
FIG. 2 is a side view of the handle of the dual mode pistol-grip grease gun.
Figure 3:
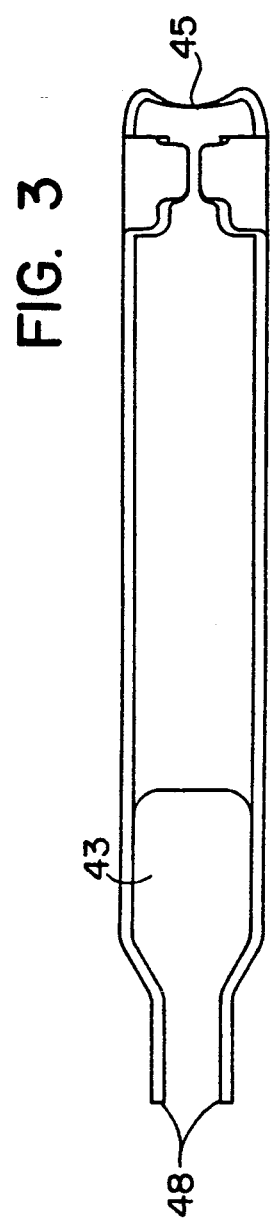
FIG. 3 is bottom view of the handle of the dual mode pistol-grip grease gun.

Turning to FIGS. 2 and 3, the handle 15 will now be more fully described. The handle 15 is generally L-shaped. It comprises a handle first end 48 and a handle second end 45. Extending from the handle second end 45, the handle 15 is extends in an essentially straight fashion, until it reaches a gentle curved portion 47. Extending from the gentle curve portion 47 is a handle-link connection slot 49 which is located at the handle first end 48. A first handle-cylinder head connection slot 44 is located essentially next to the handle-link connection slot 49 in the manner shown in FIG. 2. Extending below the handle-cylinder head connection slot 44 is a second handle-cylinder head connection slot 51. Disposed at the handle second end 45 is a protrusion 46 that extends in an essentially perpendicular fashion away from the handle 15. Referring to FIG. 3, it is seen that a passage 43 is formed into the handle 15.

Figure 4:
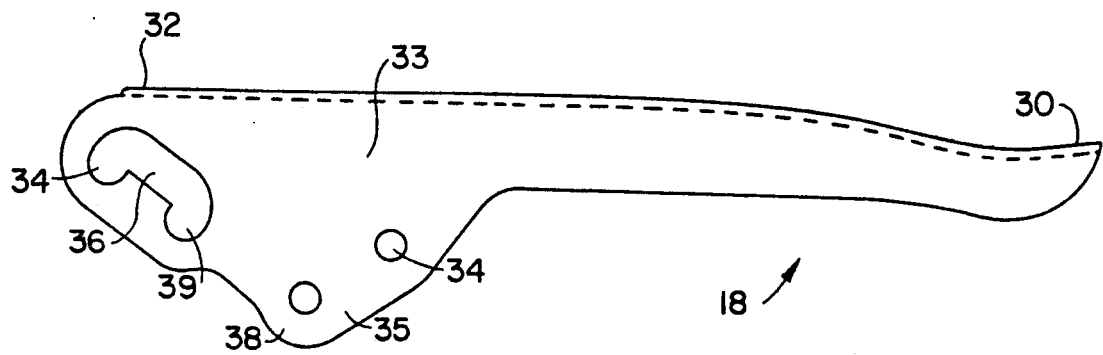
FIG. 4 is a side view of the lever of the dual mode pistol-grip grease gun.

Turning next to FIG. 4, the lever 18 will now be more fully described. The lever 18 is generally straight. It comprises a lever first end 32 and a lever second end 30. Opposite the lever second end 30 is the lever first end 32 where a U-shaped slot 36 is located. Disposed between the lever second end 30 and the lever first end 32, and extending in an essentially downward fashion, is a lever-extension 35 disposed at the lever central portion 33. The lever-extension 35 is forged as part of the lever 18. Disposed within the lever-extension 35 is a lever-piston connection slot 38 and stop slot 34.

Figure 5:
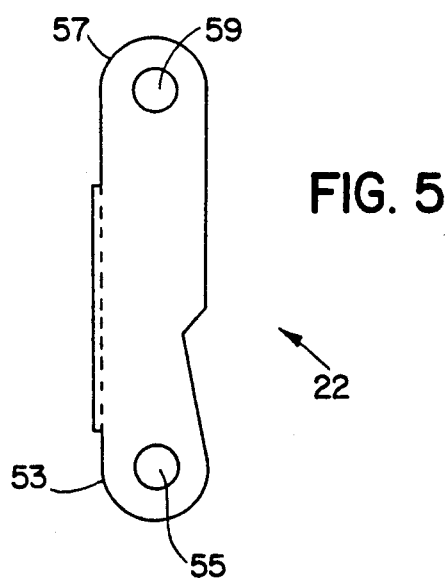
FIG. 5 is a side view of the shiftable link.

Turning now to FIG. 5, the slidable link 22 will be more fully described. The slidable link 22 has a link first end 53. At the link first end 53 there is located a link-handle connection slot 55. Opposite the link first end 53 is the link second end 57, where a link-lever connection slot 59 is located.

Figure 6:
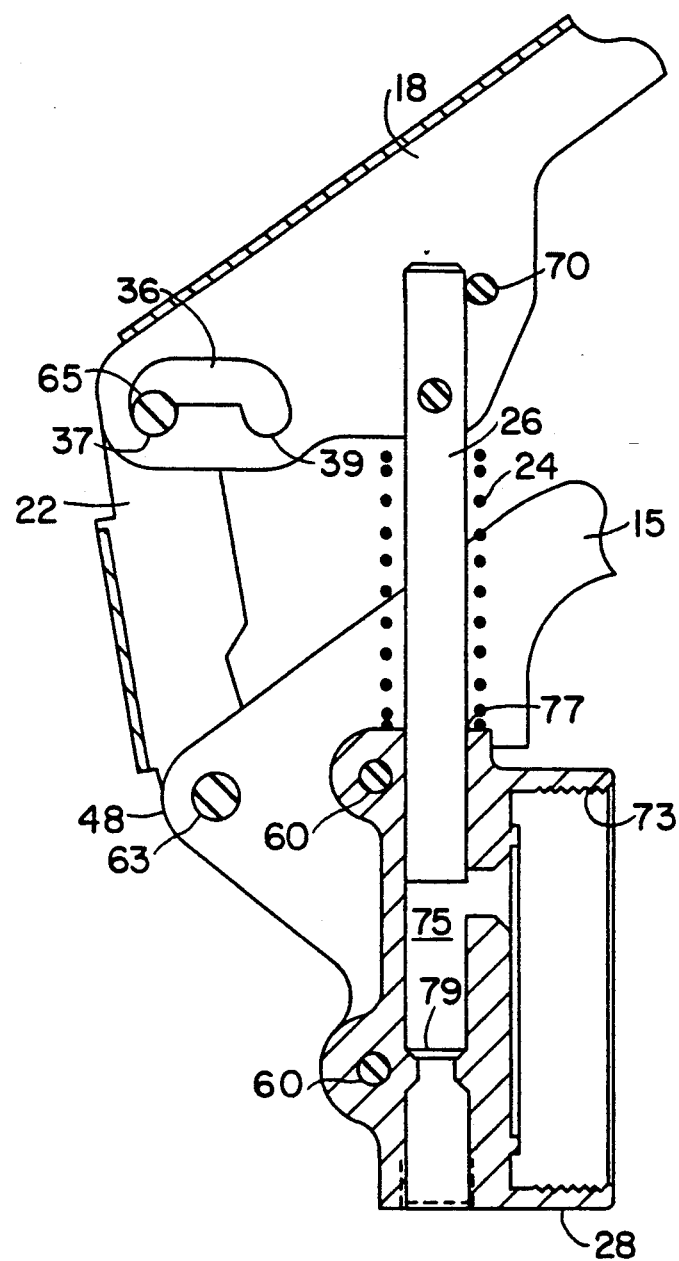
FIG. 6 is an cross-sectional expanded side view of the cylinder head, with the handle, link, lever and piston shown as well.

Turning now to FIG. 6, the cylinder head 28 will now be more fully described. The cylinder head 28 comprises a recess 73 which can be threaded to allow a cylinder 12 to be easily attached to the cylinder head 28. A piston cavity 75 is formed in the cylinder head 28, which opens at the top 77 of the cylinder head 28 so that the piston 26 can enter it. When pressure is applied to the lever 18, the piston 26 enters the piston cavity 75, thereby forcing lubricant to leave the cylinder head 28. The operation of the cylinder head 28 need not be discussed here, as all the various fluid lubricant dispenser head techniques known in the art work well in the present invention.

As noted above, the cylinder 12 of the grease gun 10 is attachable to a lubricant dispensing cylinder 28. The handle 15 is connected to the cylinder head 28 at the first handle-cylinder head slot 44 and second handle-cylinder head slot 51 by rivets 60. This affixes the handle 15 to the cylinder head 28 in such a way that it does not move, even when pressure is applied to it. Also attached to the handle 15 is the shiftable link 22. The shiftable link 22 is attached to the handle 15 at the handle-link connection slot 49 of the handle 15 and the link-handle connection slot 55 of the link 22 by a first attachment means 63. The first attachment means 63 allows the shiftable link 22 to rotatably pivot in the handle-link connection slot 49. The first attachment means can be a rivet, or any other connector that allows the shiftable link 22 to pivot in the handle-link connection slot 49.

At the link second end 57, the link 22 is connected to the lever 18 at the link-lever connection slot 59 of the link 22 and the U-shaped slot 36 of the lever 18 by a second attachment means 65. The second attachment means 65 allows the lever 18 to rotatably pivot about the shiftable link 22. The second attachment means can be a rivet, or any other connector that allows the shiftable link 22 to pivot in the U-shaped slot.

The shape of the U-shaped slot 36 allows the shiftable link 22 to be moved into two separate and distinct locations, first end portion 37 and second end portion 39. First end portion 37 and second end portion 39 are carefully disposed such that when the lever 18 is being depressed, they provide as much support for the lever 18 as possible, preferably one hundred-eighty degrees of support.

The grease gun 10 works as follows. The user grips the gun 10 with his/her palm on the lever 18 and his/her fingers gripping the handle 15. When the user applies pressure, the lever 18 begins to move downward towards the handle 15. As noted above, the handle 15 does not move. The force provided by the user results in a movement about the U-shaped slot 36 of the lever 18 towards the handle 15. As the lever 18 moves downward, the piston 26 moves through the passage 43 of the handle 15 and into the piston cavity 75 of the cylinder head 28, resulting in the emission of lubricant from the grease gun 10 from an opening in the cylinder head 28, not shown in the drawings.

An important feature of the invention is stop 70 disposed in the stop-slot 34 of the lever 18, as best seen in FIG. 6. The stop 70 serves as a stop for the lever 18 when the grease gun 10 is in the relaxed position. This is an important feature because without it, the span between the lever 18 and the handle 15 would be different for both the volume mode and the pressure mode. Different spans for different modes is undesirable. Differing spans occur because the spring 24, which surrounds the piston 26, biases the lever 18 away from the handle 15. Without the stop 70, the spring 24 would force the lever 18 farther away from the handle when the grease gun 10 is set for the pressure mode because of the position of the link 22 in the U-shaped slot 36. The stop 70 prevents the spring 24 from forcing the lever 18 above a certain, predetermined point, thereby keeping the span between the lever 18 and the handle 15 constant, regardless of whether the grease gun 10 is set for the volume mode or pressure mode. The stop 70 does this important function by resting against the piston 26 when the lever 18 opens to the certain, predetermined point. The certain predetermined point is selected for both maximum pressure or volume, depending on the mode, and for a span that maximizes the user's ability to effectively use the grease gun 10 comfortably.

The protrusion 46 disposed on the handle 15 is also an important feature. The protrusion 46 acts as a stop for the lever 18 when it is coming down towards the handle 15, nearing the fully squeezed position. Normally, the spring 24 surrounding the piston 26 Would determine the end of the stroke. This would occur when the spring 24 became fully compressed. In the present invention, the protrusion 46 is necessary when the grease gun 10 is in the pressure mode because the lever 18 would be able to depress to the point where it and the handle 15 could pinch the skin on the hand of the user, a very undesirable occurrence. The protrusion 46 also prevents the piston 26 from contacting the bottom 79 of the piston cavity 75 which could cause premature wear.

Once again referring to FIG. 1, the difference in operation between the volume mode and pressure mode will now be discussed. When the link 22 is placed in first end portion 37 of the U-shaped slot 36, the grease gun 10 will be in the volume mode. When the link 22 is in the first end position 37, the distance between the second attachment means 65 and the piston 26 is relatively long.

When the link 22 is moved from first end portion 37 to second end portion 39 of the U-shaped slot 36, the grease gun 10 will shift to the pressure mode. This occurs because the distance between the second attachment means 65 and the piston 26 shortens. This shorter distance results in a situation where for the same angular deflection of the lever 18, as compared to the volume mode, you get less travel of the piston 26. Thus, relative to the volume mode, the operator gets a greater mechanical advantage, which results in the lubricant leaving the piston cavity with greater pressure.

It is seen, therefore, that when the grease gun 10 is in the volume mode, the greatest travel of the piston 26 is possible, which results in the most lubricant being emitted from the piston cavity 75. Conversely, when the grease gun 10 is in the pressure mode, the leverage applied to the piston 26 by the lever 18 is maximized, resulting in lubricant being emitted from the piston cavity 75 with higher pressure In the pressure mode, the volume of lubricant emitted is not critical.

It will be understood that many additional changes in the details, materials, steps and arrangement of parts, which have been herein described and illustrated in order to explain the nature of the invention, may be used by those skilled in the art within the principles and scope of the invention as expressed in the appended claims.

Having thus described our invention, what we claim as new and desire to secure by Letters Patent of the United States is:

1. A dual mode pistol-grip grease gun comprising:
a cylinder head portion having a recess formed therein, said cylinder head portion further having a piston cavity therein extending through said cylinder head portion, said piston cavity being adapted to receive lubricant from a cylinder fixed in said recess;
a handle having a first end fixed to said cylinder heat portion, and a free second end, said handle having a passage formed therein;
a link having a first end and a second end, said link first end adapted to be connected to said handle at said handle first end by a first connection means; 'a lever having a first end having a U-shaped slot therein, said link second end being slidably mounted in said U-shaped slot by a second connection means, said U-shaped slot having a first end portion adapted to receive a link second end and a second end portion adapted to receive said link second end, wherein said link second end is movable between said slot first end portion and said slot second end portion, wherein positioning said link second end in said slot first portion adapts said gun to operate in a volume mode and wherein positioning said link second end in said slot second portion adapts said gun to operate in a pressure mode;
a piston rotatably fastened to a central portion of said lever, said piston passing through said passage formed in said handle and in alignment with said piston cavity;
a spring surrounding said piston that biases said lever away from said handle; and
a stop disposed in said lever central portion and engageable with a side of said piston to define a maximum withdrawal position of said piston from said piston cavity, the distance between said stop and said piston rotatable fastening defining a fixed distance to thereby prevent said lever from moving further away from sad handle regardless of the position of said link second end in said slot.

2. The grease gun of claim 1 wherein said first and second connection means are rivets.

* * * * *